(12) United States Patent
Wakrat et al.

(10) Patent No.: US 8,949,508 B2
(45) Date of Patent: Feb. 3, 2015

(54) NON-VOLATILE TEMPORARY DATA HANDLING

(75) Inventors: Nir J. Wakrat, Los Altos, CA (US);
Daniel J. Post, Campbell, CA (US)

(73) Assignee: Apple Inc., Cupertino, CA (US)

( * ) Notice: Subject to any disclaimer, the term of this patent is extended or adjusted under 35 U.S.C. 154(b) by 200 days.

(21) Appl. No.: 13/184,647

(22) Filed: Jul. 18, 2011

(65) Prior Publication Data

US 2013/0024600 A1    Jan. 24, 2013

(51) Int. Cl.
*G06F 9/44* (2006.01)
*G06F 12/02* (2006.01)
*G06F 12/08* (2006.01)

(52) U.S. Cl.
CPC .... *G06F 12/0246* (2013.01); *G06F 2212/7201* (2013.01); *G06F 9/4418* (2013.01); *G06F 12/08* (2013.01); *G06F 2212/1041* (2013.01); *G06F 2212/7209* (2013.01)
USPC .................... 711/103; 711/203; 711/E12.008

(58) Field of Classification Search
None
See application file for complete search history.

(56) References Cited

U.S. PATENT DOCUMENTS

| | | | | |
|---|---|---|---|---|
| 5,666,540 | A * | 9/1997 | Hagiwara et al. | 713/323 |
| 6,209,088 | B1 | 3/2001 | Reneris | |
| 6,336,153 | B1 | 1/2002 | Izumida et al. | |
| 6,574,717 | B1 * | 6/2003 | Ngai et al. | 711/147 |
| 7,308,587 | B2 | 12/2007 | Inui et al. | |
| 8,380,676 | B1 * | 2/2013 | Eastham et al. | 707/662 |
| 8,694,814 | B1 * | 4/2014 | Salomon et al. | 713/323 |
| 2003/0126391 | A1 * | 7/2003 | Neufeld et al. | 711/165 |
| 2004/0064647 | A1 * | 4/2004 | DeWhitt et al. | 711/135 |
| 2005/0044332 | A1 | 2/2005 | de Brebisson | |
| 2005/0117418 | A1 | 6/2005 | Jewell et al. | |
| 2006/0288153 | A1 * | 12/2006 | Tanaka et al. | 711/103 |
| 2007/0234028 | A1 | 10/2007 | Rothman et al. | |
| 2008/0104308 | A1 | 5/2008 | Mo et al. | |
| 2008/0307158 | A1 * | 12/2008 | Sinclair | 711/103 |
| 2009/0240678 | A1 * | 9/2009 | Sadovsky et al. | 707/5 |
| 2010/0049775 | A1 * | 2/2010 | Rajawat | 707/813 |
| 2010/0161121 | A1 | 6/2010 | Finsterwalder | |
| 2010/0169540 | A1 * | 7/2010 | Sinclair | 711/103 |
| 2010/0235594 | A1 * | 9/2010 | Heller et al. | 711/162 |

(Continued)

FOREIGN PATENT DOCUMENTS

EP        2299364        3/2011

OTHER PUBLICATIONS

Heeseung Jo et al. "FAB: Flash-Aware Buffer Management Policy for Portable Media Players." May 2006. IEEE. IEEE Transactions on Consumer Electronics. vol. 52. pp. 485-493.*
Andrew Birrell et al. "A Design for High-Performance Flash Disks." Apr. 2007. ACM. ACM SIGOPS Operating Systems Review. vol. 41. pp. 88-93.*

(Continued)

*Primary Examiner* — Nathan Sadler
(74) *Attorney, Agent, or Firm* — Van Court & Aldridge LLP (57) ABSTRACT

Systems and methods are provided for handling temporary data that is stored in a non-volatile memory, such as NAND flash memory. The temporary data may include hibernation data or any other data needed for only one boot cycle of an electronic device. When storing the temporary data in one or more pages of the non-volatile memory, the electronic device can store a temporary marker as part of the metadata in at least one of the pages. This way, on the next bootup of the electronic device, the electronic device can use the temporary marker to determine that the associated page contains unneeded data. The electronic device can therefore invalidate the page and omit the page from its metadata tables.

16 Claims, 4 Drawing Sheets

(56) References Cited

U.S. PATENT DOCUMENTS

| | | |
|---|---|---|
| 2010/0325351 A1 | 12/2010 | Bennett |
| 2011/0066808 A1 | 3/2011 | Flynn et al. |
| 2011/0113183 A1 | 5/2011 | Lee et al. |
| 2011/0225388 A1* | 9/2011 | Oh et al. ............... 711/206 |
| 2013/0024600 A1 | 1/2013 | Wakrat et al. |

OTHER PUBLICATIONS

Joe et al. "Bootup Time Improvement for Embedded Linux using Snapshot Images Created on Boot Time." Next Generation Information Technology (ICNIT). 2011 The 2nd International Conference on IEEE. Jun. 21, 2011. pp. 193-196.

* cited by examiner

NON-VOLATILE TEMPORARY DATA HANDLING

BACKGROUND OF THE DISCLOSURE

NAND flash memory, as well as other types of non-volatile memories ("NVMs"), are commonly used in electronic device for mass storage. For example, consumer electronics such as portable media players, often include NAND flash memory to store music, videos, and other media programs. Such data is typically intended to be stored for long periods of time, such as on the order of days, months, or even years.

NVMs may also be used in electronic devices for purposes other than long-term storage. For example, the electronic device may temporarily store data from a volatile memory into a NVM to enable the volatile memory to power down during a reduced power, hibernation state without losing the data. As another example, a NVM can be used in virtual memory schemes to increase the apparent size of the electronic device's volatile memory.

SUMMARY OF THE DISCLOSURE

Systems and methods are provided for processing data intended for short-term storage in a non-volatile memory, such as a flash memory. By allowing short-term storage to be handled differently from long-term data, the memory management efficiency and effectiveness of a NVM can be increased.

Short-term storage may include the storage of data in a NVM that is needed only during a current instance of an operating system, and is no longer useful once the electronic device is shut down or rebooted (or even earlier). This data may be referred to as "non-volatile temporary data" or "NV temporary data," since the data is needed temporarily, but is stored on a persistent non-volatile medium. NV temporary data can include, for example, hardware-based hibernation data, application-generated data, application-based hibernation data, swap files, and other temporary files.

In some embodiments, when storing NV temporary data, the electronic device can decorate the NV temporary data with a temporary marker. For example, for each page of the NVM in which the electronic device stores NV temporary data, the electronic device can include a temporary marker in the metadata of the page. Alternatively, the electronic device can provide a temporary marker in at least one page of a block storing NV temporary data. This allows the electronic device to distinguish the NV temporary data from information needed across multiple device bootups.

During bootup of the electronic device, the electronic device may be configured to perform various startup procedures, such as constructing metadata tables. The metadata tables can include, for example, a table indicating which logical addresses issued by the file system (e.g., logical block addresses ("LBAs")) are currently allocated and/or a logical-to-physical address map. The electronic device may create the metadata tables by scanning through the pages of the NVM and determining whether each page includes a temporary marker (or whether each page is in a block marked for storing NV temporary data). If a page includes a temporary marker, the data included in the page was useful only in the previous boot of the electronic device and is not needed in the current boot. Thus, the electronic device can mark the page as having invalid data and omit the page (and its stored metadata) from the metadata tables. By performing such cleanup operations at bootup, the electronic device can ensure efficient use of the NVM memory locations from the outset. That is, at no point during the current boot cycle will the electronic device perform needless operations during garbage collection or wear leveling to maintain the obsolete NV temporary data.

In some embodiments, the electronic device can select memory locations and/or programming techniques for storing data based on whether the data is NV temporary data. For example, the electronic device can select lower-performance memory locations, such as less reliable pages or blocks (e.g., high cycled blocks), to store NV temporary data. In some embodiments, the electronic device can select higher-speed memory locations or programming techniques for storing NV temporary data, such as single-level cell ("SLC") blocks.

BRIEF DESCRIPTION OF THE DRAWINGS

The above and other aspects and advantages of the invention will be apparent upon consideration of the following detailed description, taken in conjunction with accompanying drawings, in which like reference characters refer to like parts throughout, and in which.

DETAILED DESCRIPTION

Figure 1:
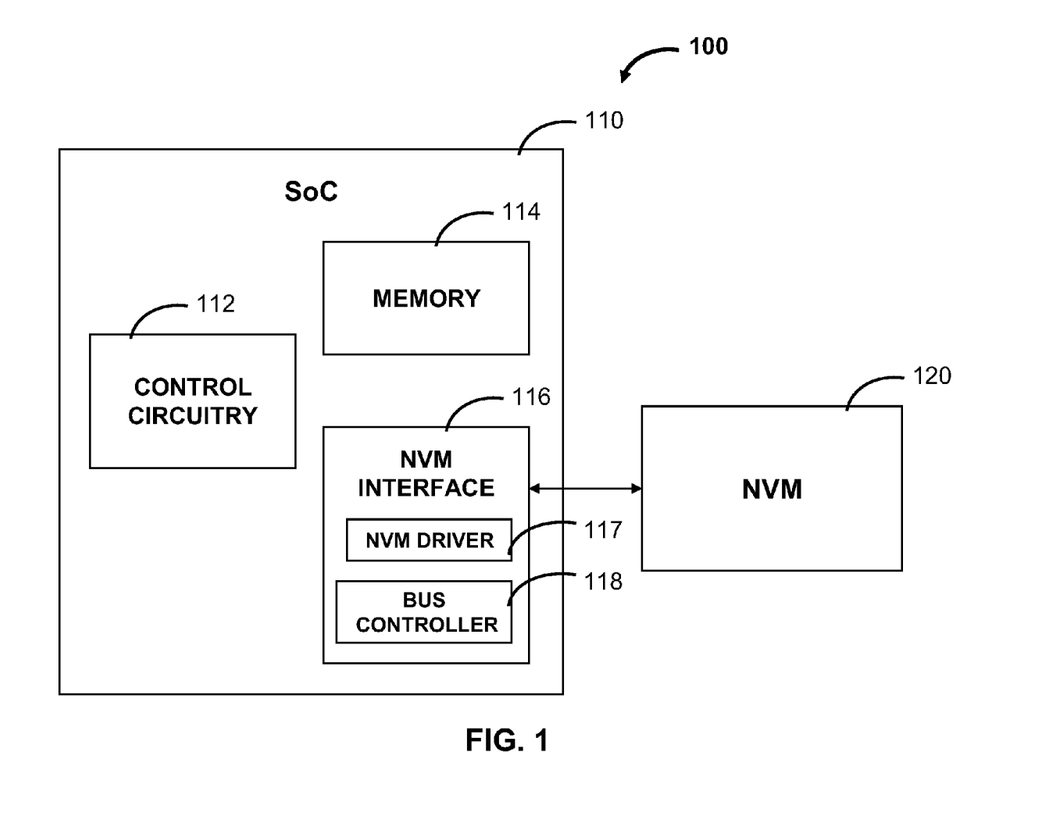
FIG. 1 is a block diagram of an illustrative electronic device having a non-volatile memory configured in accordance with various embodiments of the invention.

FIG. 1 is a block diagram of illustrative electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, a laptop computer, and any other suitable type of electronic device or system.

Electronic device 100 can include system-on-a-chip ("SoC") 110 and non-volatile memory ("NVM") 120. NVM 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof.

NVM 120 can be organized into "blocks", which is the smallest erasable unit, and further organized into "pages," which may be the smallest unit that can be programmed or read. In some embodiments, NVM 120 can include multiple integrated circuits, where each integrated circuit may have multiple blocks. The blocks from corresponding integrated circuits (e.g., blocks having the same position or block number) may form logical units referred to as "super blocks." Each memory location (e.g., page or block) of NVM 120 can be addressed using a physical address (e.g., a physical page address or physical block address). While only one NVM is shown in FIG. 1, electronic device 100 can alternatively include multiple NVM packages.

System-on-a-chip 110 can include control circuitry 112, memory 114, and NVM interface 116. Control circuitry 112 can control the general operations and functions of SoC 110 and electronic device 100 in general. Control circuitry 112 can include any suitable components, circuitry, or logic, such as one or more processors. Control circuitry 112 may operate under the control of a program, such as an application, operating system, or a NVM driver (e.g., NVM driver 117) loaded in memory 114.

Memory 114 can include any suitable type of volatile memory, such as random access memory ("RAM") (e.g., static RAM ("SRAM"), dynamic random access memory ("DRAM"), synchronous dynamic random access memory ("SDRAM"), double-data-rate ("DDR") RAM), cache memory, or any combination thereof. In some embodiments, memory 114 may act as the main memory for any processors implemented as part of control circuitry 112. In these and other embodiments, memory 114 can store data that may also be stored, at one point or another (i.e. concurrently or at different times), in NVM 120 as NV temporary data. As described above, NV temporary data includes data stored in a NVM that is needed only during a current instance of the operating system, and is no longer useful once electronic device 100 is shut down or rebooted (or earlier).

For example, memory 114 and/or NVM 120 can store NV temporary data in the form of hardware-based hibernation data. Hardware-based hibernation data may include data transferred from memory 114 to NVM 120 responsive to entering a hardware-based hibernation state (e.g., a reduced power state in which memory 114 is powered off). Thus, hardware-based hibernation data can include data that enables electronic device 100 to return to its pre-hibernation operational state (e.g., the state it was in prior to entering into the reduced power state) when it wakes up from the hibernation state. The hardware-based hibernation data may represent the current operational states of the device, for both hardware and software. For example, device state data may specify which programs are actively running, or more specifically, which media asset (e.g., song) is being played back, or the position within the graphical user interface the user is currently accessing. Because a user would not expect electronic device 100 to return to its pre-hibernation operational state should the user shut down electronic device 100 during hardware hibernation, such hardware-based hibernation data is an example of NV temporary data.

In some embodiments, memory 114 and/or NVM 120 can store application-generated data as NV temporary data. The application-generated data may include any temporarily useful data associated with or generated by an application, such as data pertaining to a current game in a gaming application. In some embodiments, the application can provide an indication to the operating system and file system of the temporary nature of the application-generated data so that this data can ultimately be stored as NV temporary data in NVM 120.

In some scenarios, memory 114 and/or NVM 120 can be used to store NV temporary data in the form of application-based hibernation data. Application-based hibernation data may include data, such as application-generated data, transferred from memory 114 to NVM 120 responsive to a particular application or program entering into a hibernation state. Electronic device 100 can select the application for hibernation to free up space in memory 114 when space is running low and the application is not being actively used. Thus, the application-based hibernation data can include data that enables electronic device 100 to return a hibernated application back to its pre-hibernation operational state. Because a user would not expect hibernating application to return its exact former state if electronic device 100 were rebooted, application-based hibernation data is another example of NV temporary data.

In these and other scenarios, memory 114 and/or NVM 120 can be used for storing NV temporary data in connection with virtual memory schemes. For example, the application-generated data, application-based hibernation data, or any other data used by one or more applications can be transferred from memory 114 to a "swap file" or "page file" in NVM 120. Here, data can be paged out of memory 114 into a file stored in NVM 120, thereby freeing up space in memory 114 when space is needed. Other file types used in virtual memory schemes to convey NV temporary data between memory 114 and NVM 120 may also be contemplated. Because the data used in a virtual memory scheme is generally not needed once electronic device 100 is shut down, a swap file is another example of NV temporary data.

Memory 114 and/or NVM 120 may store NV temporary data of any other suitable type, such as any data typically stored in a "temp file" on UNIX-based systems. For example, NV temporary data can include data stored in temporary files on NVM 120 that one program or application creates to pass the data to another program or application. As another example, NV temporary data can include short-term data stored in temporary files on NVM 120 that is too large to fit into memory 114 or would take up more than a predetermined amount of space in memory 114.

To enable the components of SoC 110 (such as memory 114) to pass information to and from NVM 120, SoC 110 can include NVM interface 116. NVM interface 116 may include any suitable combination of hardware, software, and firmware configured to act as an interface or driver between NVM 120 and the non-NVM-specific components of SoC 110. For example, NVM interface 116 can include NVM driver 117 to provide a software/firmware interface that gives the operating system and file system indirect access to NVM 120, thereby allowing the operating system and file system to issue read or write requests to store or retrieve NV temporary data in or from NVM 120. NVM interface 116 can further include bus controller 118, which may include any suitable hardware components that enable NVM driver 117 to access NVM 120 using the bus specifications (e.g., data rate) of NVM 120.

NVM interface 116 may perform various tasks to manage the memory locations of NVM 120, such as garbage collection, wear leveling, and bad block management. NVM driver 117 may be configured to maintain or generate "metadata," which can be any memory management data used by NVM driver 117 to manage NVM 120 and the memory locations therein. NVM driver 117 may be configured to maintain metadata tables or mappings, such as a table indicating which logical addresses issued by the file system (e.g., logical block addresses ("LBAs")) are currently allocated for use and/or a mapping between logical addresses and physical addresses of NVM 120. Logical addresses are issued by the file system on read or write requests, which NVM driver 170 may map to different physical addresses that actually correspond to physical memory locations of NVM 120. NVM driver 117 can therefore maintain the metadata tables in order to properly handle the read and write requests from the file system.

NVM interface 116 is depicted in FIG. 1 as being implemented completely on SoC 110. In some embodiments, some of the components of NVM interface 116, as well as some of the functionality of NVM driver 117, may be implemented and performed by a separate memory controller (e.g., flash controller) included, for example, in NVM 120. Thus, it should be understood that any descriptions of NVM interface 116 or NVM-related functionality are not limited to components or actions performed on SoC 110.

NVM interface 116 may receive write requests from the file system to store any of a variety of types of data. For example, the file system may instruct NVM interface 116 to store media assets, such as songs and videos, for an indefinite period of time. In other scenarios, the file system may instruct NVM interface 116 to store NV temporary data, such as hardware-based hibernation data, application-generated data, application-based hibernation data, swap files, or other temporary files, in NVM 120. Because NV temporary data has such a different expected lifespan (i.e. one boot cycle of electronic device 100) than other forms of data (i.e. more than one boot cycle of electronic device 100), NVM interface 116 may be configured to handle NV temporary data in a different manner that can increase the effectiveness and efficiency of memory use in NVM 120.

In some embodiments, NVM interface 116 may select memory locations (i.e. pages, blocks, or super blocks) in which to store data based on whether the data is temporary data. For example, NVM interface 116 can select lower-performance memory locations for storing NV temporary data. The lower-performance memory locations may be less reliable pages or blocks, such as high cycled blocks (i.e. blocks that have been through more erase cycles, and may therefore have experienced more deterioration). NVM interface 116 may select higher-performance memory locations for storing non-temporary data, since non-temporary data is expected to be maintained in NVM 120 for a longer period of time.

In some embodiments, NVM interface 116 can select higher-speed memory locations or programming techniques for storing NV temporary data. This way, the delay between transferring data between memory 114 and NVM 120 is reduced, which may be beneficial for virtual memory schemes, when entering into a reduced-power hibernation mode, or in a variety of other situations. To improve speed, NVM interface 116 can select single-level cell ("SLC") blocks or can decrease the tuning resolution when programming the blocks with NV temporary data. NVM interface 116 can choose SLC blocks to increase programming speed while also improving reliability.

In some embodiments, NVM interface 116 can handle NV temporary data differently from other data by decorating NV temporary data with a "temporary marker" when storing the NV temporary data in NVM 120. This way, when data is read back out of NVM 120, NVM interface 116 can quickly and efficiently differentiate the NV temporary data with other information intended to be stored for a longer period of time.

Figure 2:
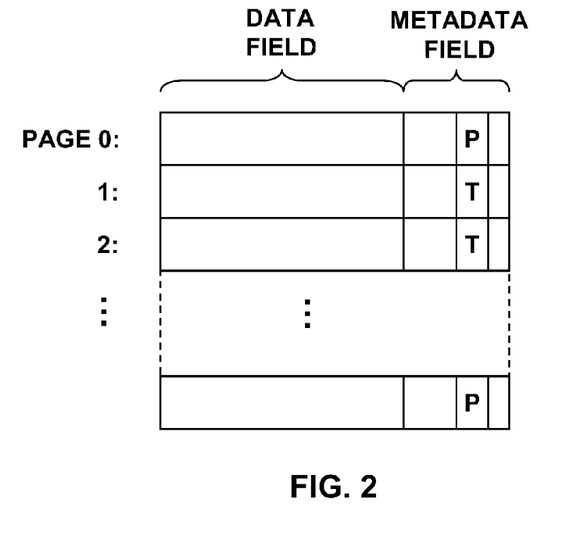
FIGS. 2 and 3 are graphical representations of illustrative non-volatile memory locations storing non-volatile temporary data in accordance with various embodiments of the invention.

FIG. 2 illustrates one way in which NVM interface 116 can decorate the NV temporary data with a temporary marker. FIG. 2 is a graphical representation of the pages in a block of a non-volatile memory, such as NVM 120 of FIG. 1. As illustrated, each page of the block may be used to store a data field and an associated metadata field. Each data field can store any suitable type of data, such as NV temporary data or any data that the file system requested to be stored (e.g., media assets). The metadata field of the same page can store metadata associated with the data in the data field, such as any memory management data received or generated by NVM driver 117, including error correction code ("ECC") data, any information used for managing the mapping between logical and physical addresses (e.g., an LBA), and the like.

The metadata field can include space for storing a marker indicating whether the data in the data field is NV temporary data. For example, the "T" (or "temporary") markers in the metadata fields of pages 1 and 2 in FIG. 2 indicate that the associated data fields include NV temporary data, while the "P" (or "persistent") markers in the metadata field of page 0 and the last page of the block indicate that the data in the associated data fields include data intended for persistent, longer-term storage. The "T" temporary marker and the "P" persistent marker may be implemented using any suitable approach. That is, these markers may include any suitable number of bits (e.g., one or more bits) and the actual bit or word values of the "T" and "P" markers can each take on any suitable predetermined bit pattern.

In some embodiments, NVM interface 116 may not use a specific "P" marker, and may instead use only "T" temporary markers to indicate where NV temporary data is stored in NVM 120. In these embodiments, on readback of a page, NVM interface 116 can determine that the page's data field does not contain NV temporary data based on the lack of a temporary marker in the metadata field.

FIG. 2 provides an example where the same block can include both NV temporary data as well as persistent data. In other embodiments, such as the embodiment illustrated in FIG. 3, an entire block or superblock may be used to store either NV temporary data or persistent data.

Figure 3:
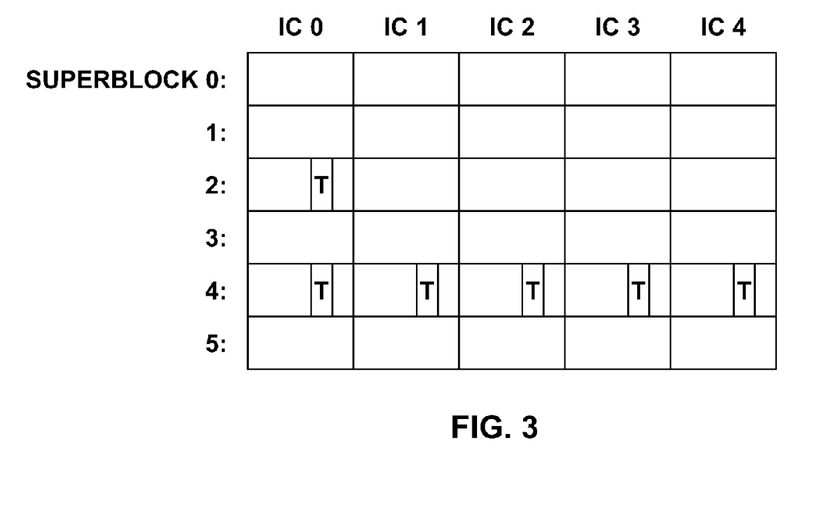

FIG. 3 is a graphical representation of multiple blocks across several integrated circuits of a non-volatile memory, such as NVM 120 of FIG. 1. Each column represents a different integrated circuit and each row represents a different superblock. Thus, as illustrated in the first integrated circuit ("IC 0"), an entire block (i.e., block 2) may be used to store NV temporary data. In some embodiments, NVM interface 116 can provide a temporary marker in every used page of the block, which can provide extra insurance that NVM interface 116 can correctly interpret this block as storing NV temporary data. In other embodiments, NVM interface 116 may store temporary markers in a subset of the pages in the block. For example, NVM interface 116 can store a temporary marker in only the first page of the block so that NVM interface 116 can later determine whether the block contains NV temporary data when reading the block from the first page to the last page.

Alternatively, NVM interface 116 can store a temporary marker in only the last page (so NVM interface 116 can later read the block from last page to first page), or NVM interface 116 can store temporary markers in both the first and last pages of the block.

In some embodiments, NVM interface 116 may select an entire superblock for use in storing NV temporary data. This is illustrated in the fifth superblock ("SUPERBLOCK 4") in FIG. 3, where all of the blocks in the superblock can be used for storing NV temporary data. As with single-block case, NVM interface 116 may or may not store temporary markers in all of the used pages of the superblock. Instead, NVM interface 116 can store temporary markers in only the first page of each block in the superblock, only the last page of each block in the superblock, in both the first and last pages of each block, or in one or more pages of a subset of the blocks in the superblock.

While not depicted in the figure to preserve clarity, the blocks that do not include "T" temporary markers may (or may not) include "P" persistent markers in some or all of the pages. Moreover, while five integrated circuits and six superblocks (for a total of 30 blocks) are illustrated, it should be understood that NVM 120 can include any other suitable number of integrated circuits and superblocks.

NVM interface 116 can use the temporary markers decorating the NV temporary data to process the NV temporary data differently from other types of data. For example, the temporary markers can affect the bootup process of electronic device 100. Upon bootup of electronic device 100, NVM driver 117 may perform a series of initialization procedures so that NVM driver 117 can properly determine the current state of NVM 120. Included in the initialization procedures may be the reconstruction of one or more metadata tables or maps, such as the table indicating which logical addresses are being used and the logical-to-physical address mapping.

To reconstruct the tables, NVM driver 117 may read each page of NVM 120 and, for each page, may determine whether to include the page in the tables. If NVM driver 117 determines that the page is designated with a temporary marker (or is in a block or superblock currently designated with temporary markers), NVM driver 117 can leave the page out of the tables. This is because the page has been used to store NV temporary data, which was only valid during the previous boot of electronic device 100. Thus, NVM driver 117 can mark the page as invalid so that, at some appropriate time, the page can be freed up (e.g., during garbage collection or wear leveling) and used to store other information. Since NVM driver 117 invalidates the page and omits it from the tables right at bootup time, memory use of NVM 120 may be made immediately efficient. That is, at no point during the current boot cycle will NVM driver 117 perform needless operations during garbage collection or wear leveling to maintain the now-obsolete NV temporary data.

Figure 4:
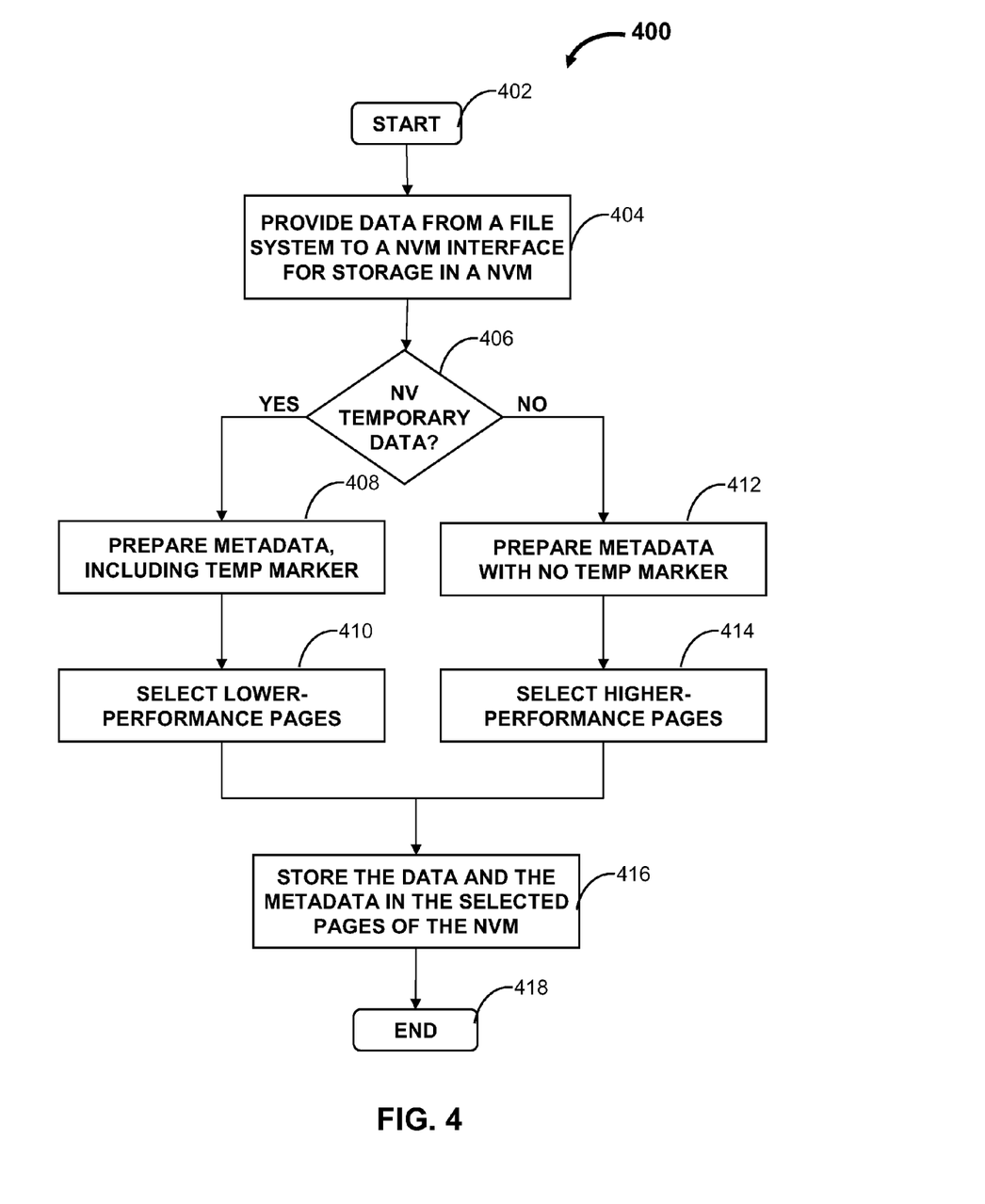
FIG. 4 is a flowchart of an illustrative process for decorating non-volatile temporary data in a non-volatile memory with a temporary marker in accordance with various embodiments of the invention.
Figure 5:
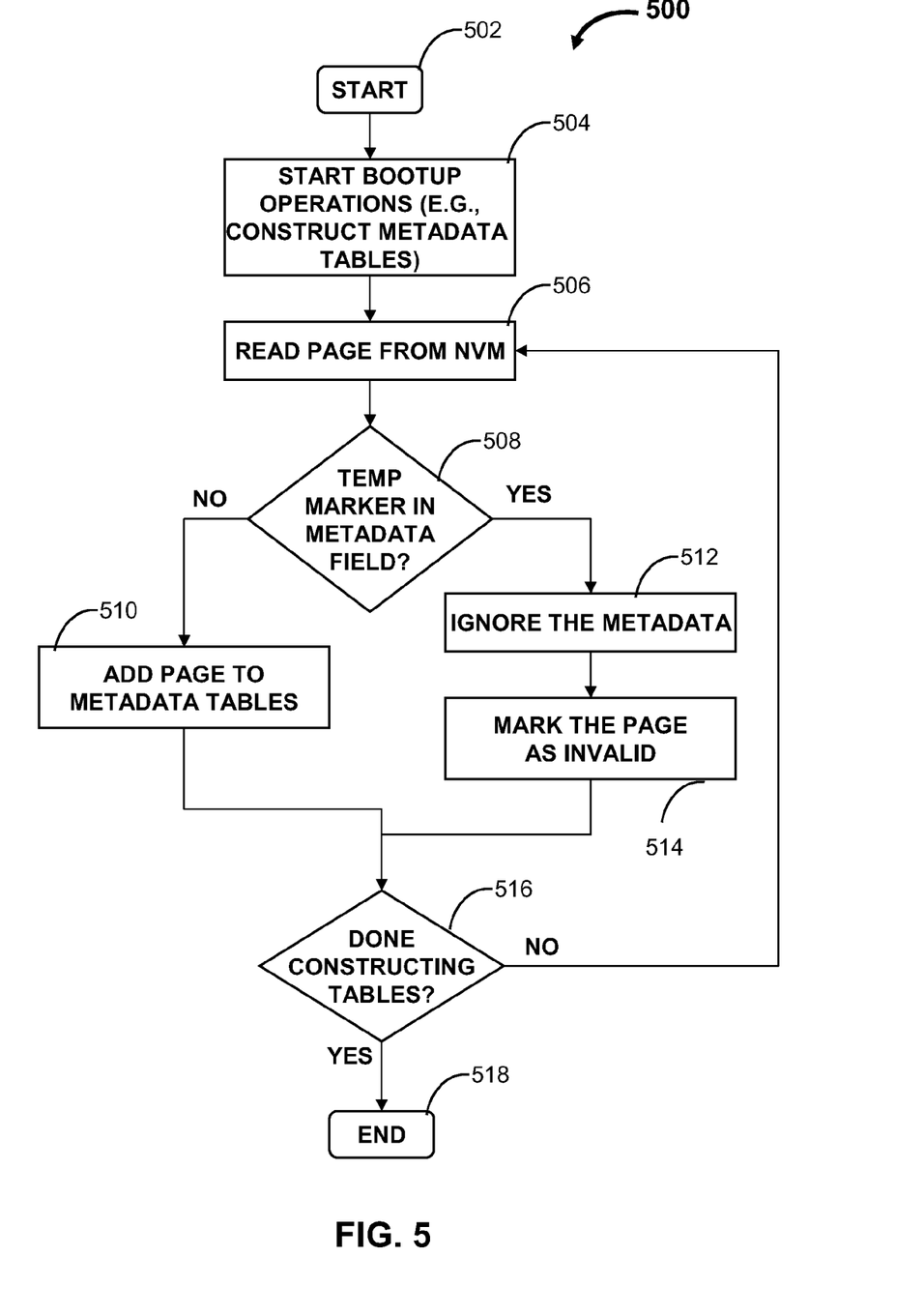
FIG. 5 is a flowchart of an illustrative process for processing non-volatile temporary data at bootup of an electronic device in accordance with various embodiments of the invention.

Referring now to FIGS. 4 and 5, flowcharts of illustrative processes are shown in accordance with various embodiments of the invention. The steps of these illustrative processes may be performed by any suitable component or combination of components in an electronic device, such as by control circuitry 112 (FIG. 1) operating under the control of NVM driver 117 (FIG. 1).

Looking first at FIG. 4, process 400 is shown for decorating NV temporary data with a temporary marker when storing the NV temporary data in a NVM, such as NVM 120 (FIG. 1). Process 400 may begin at step 402, where the file system may decide to store data in the NVM. For NV temporary data, this can occur, for example, when the volatile memory is running out of space or when the volatile memory needs to be powered down in a reduced power state (i.e. hibernation state).

At step 404, data may be provided from the file system to the NVM interface (e.g., a NVM driver) for storage in the NVM. Then, at step 406, the NVM interface can determine whether this data is temporary data that should be stored as NV temporary data. In some embodiments, the NVM interface can interpret whether the data is temporary data based on the write request received from the file system. The file system may have issued a write request signaling that the data is temporary data in response to an indication from an application.

If, at step 406, the NVM interface determines that the data is NV temporary data, the NVM interface can prepare metadata for the data at step 408, where the metadata includes a temporary marker. Preparing the metadata at step 408 (or step 412, discussed below) can include determining and maintaining a mapping from a logical address (received with the write request) to a physical address associated with the NVM. The NVM interface can also select, at step 410, lower-performance and/or higher-speed memory locations (i.e. pages, blocks, or super blocks) or programming techniques for storing the data, since the data is expected to have a short lifespan in non-volatile memory. For example, the NVM interface can select less reliable blocks (e.g., high cycled blocks) or SLC blocks in which to store the data.

Otherwise, if the NVM interface determines at step 406 that the data is not NV temporary data, the NVM interface can prepare metadata that does not include a temporary marker (and may instead include a persistent marker) at step 412. In this case, because the data may be stored long-term in non-volatile memory, the NVM interface can select higher-performance and/or lower-speed memory locations or programming techniques for storing the data at step 414. For example, the NVM interface can select more reliable blocks or MLC blocks in which to store the data.

From step 410 or step 414, process 400 can continue to step 416, where the NVM interface can store the data (whether it be NV temporary data or other data) and at least some of its associated metadata in the selected one or more pages of the NVM. Process 400 may then end at step 418.

Turning now to FIG. 5, process 500 is shown for processing NV temporary data at bootup of an electronic device. Process 500 may begin at step 502 at bootup of the electronic device. At step 504, an NVM interface can perform various bootup procedures so that the NVM interface can determine the initial state of the NVM and its memory locations. The initial bootup procedures can therefore include constructing metadata tables, such as a table indicating which logical addresses are allocated for use and/or a mapping of logical-to-physical addresses for each page of the NVM that contains valid data.

From step 504, the NVM interface can prepare the tables by scanning through and processing each page of the NVM. In particular, at step 506, the NVM interface can read a first page from the NVM, and at step 508, the NVM interface can determine whether this first page includes a temporary marker in the page's metadata field. If not, the first page does not include NV temporary data, so at step 510, the NVM interface can add the page to the tables. For example, the NVM interface may determine (e.g., from the metadata field) the logical address associated with the page and may add the page's logical-to-physical address mapping to the appropriate table, or the NVM interface may indicate in a table that the logical address is currently allocated by the file system.

If, at step 508, the NVM interface determines instead that the page includes a temporary marker in the page's metadata field, process 500 can continue to step 512. Because the temporary marker indicates that the page stores NV temporary data, which is no longer valid now that the electronic device has been rebooted, process 500 can branch to step 512. At step 512, the NVM interface can ignore the metadata in the page for purposes of metadata table reconstruction. For example, while a logical address stored in the page would otherwise have indicated that the logical address is being used by the file system, the NVM interface can ignore the presence of the logical address in the page. Then, at step 514, the NVM interface can mark the page as containing invalid data. This may allow the NVM interface to, at the appropriate time, perform garbage collection on the page to free up space for storing other information.

From step 510 or step 514, process 500 can continue to step 516, where the NVM interface can determine whether the metadata tables are done being constructed. This determination can involve determining whether there are additional pages that have not yet been read and processed. If there are additional pages that need to be considered for inclusion in the metadata tables, process 500 may return to step 506 so that NVM interface can read another page of the NVM. Otherwise, if there are no additional pages, process 500 can end at step 518.

It should be understood that the steps of processes 400 and 500 of FIGS. 4 and 5, respectively, are merely illustrative. Any of the steps may be modified, removed, or combined, and additional steps may be included, without departing from the scope of the invention.

The described embodiments of the invention are presented for the purpose of illustration and not limitation.

What is claimed is:

1. An electronic device comprising:
    a volatile memory for storing application-generated data associated with at least one application that is operating in a pre-hibernation state;
    a non-volatile memory ("NVM") comprising a plurality of pages; and
    control circuitry operative to:
        receive an indication that an application operating in the pre-hibernation state is entering into a hibernation state; and
        store the application-generated data associated with the application entering into the hibernation state as temporary data in the non-volatile memory, wherein the control circuitry stores a temporary marker in at least one of the pages in which the temporary data is stored and wherein the temporary data comprises data that is required for only one boot cycle of the electronic device such that upon reboot of the device, any page that contains the temporary marker is ignored and not included in a logical-to-physical mapping table of the NVM, and wherein the application-generated data comprises data that enables the application in the hibernating state to revert back to the pre-hibernation operating state.

2. The electronic device of claim 1, wherein the electronic device is further operative to:
    prepare metadata for the temporary data; and
    store the metadata and the temporary marker in a metadata field of the at least one of the pages in which the temporary data is stored.

3. The electronic device of claim 1, wherein the temporary marker comprises a predetermined bit pattern.

4. The electronic device of claim 1, wherein the plurality of pages are organized into blocks, and wherein the control circuitry is further operative to:
    select one of the blocks for storing the temporary data; and
    store a temporary marker in at least one page of the selected block.

5. The electronic device of claim 4, wherein the control circuitry is further operative to store a temporary marker in all of the pages of the selected block.

6. The electronic device of claim 1, and wherein the control circuitry is further operative to:
    identify that the volatile memory is in a low memory state; and
    store the temporary data in the non-volatile memory responsive to identifying the low memory state.

7. The electronic device of claim 1, wherein the control circuitry is further operative to select lower-performance pages for storing the temporary data.

8. The electronic device of claim 1, wherein the control circuitry is further operative to select a higher-speed programming technique for storing the temporary data.

9. A method of storing data in a non-volatile memory, wherein the non-volatile comprising a plurality of pages, the method comprising:
    storing, in volatile memory, application-generated data associated with at least one application that is operating in a pre-hibernation state;
    receiving an indication that an application operating in the pre-hibernation state is entering into a hibernation state; and
    storing, in non-volatile memory, the application-generated data associated with the application entering into the hibernation state as temporary data in the non-volatile memory, wherein the control circuitry stores a temporary marker in at least one of the pages in which the temporary data is stored and wherein the temporary data comprises data that is required for only one boot cycle of the electronic device such that upon reboot of the device, any page that contains the temporary marker is ignored and not included in a logical-to-physical mapping table of the non-volatile memory, and wherein the application-generated data comprises data that enables the application in the hibernating state to revert back to the pre-hibernation operating state.

10. The method of claim 9, further comprising:
    preparing metadata for the temporary data; and
    storing the metadata and the temporary marker in a metadata field of the at least one of the pages in which the temporary data is stored.

11. The method of claim 9, wherein the temporary marker comprises a predetermined bit pattern.

12. The method of claim 9, wherein the plurality of pages are organized into blocks, the method further comprising selecting one of the blocks for storing the temporary data; and store a temporary marker in at least one page of the selected block.

13. The method of claim 12, further comprising storing a temporary marker in all of the pages of the selected block.

14. The method of claim 9, further comprising:
    identifying that the volatile memory is in a low memory state; and
    storing the temporary data in the non-volatile memory responsive to identifying the low memory state.

15. The method of claim 9, further comprising selecting lower-performance pages for storing the temporary data.

16. The electronic device method of claim 9, further comprising selecting a higher-speed programming technique for storing the temporary data.

* * * * *